United States Patent [19]

McDonald

[11] 4,086,505
[45] Apr. 25, 1978

[54] ELECTROMAGNETIC SYSTEM

[76] Inventor: James A. McDonald, 27208 Walker, Warren, Mich. 48092

[21] Appl. No.: 603,596

[22] Filed: Aug. 11, 1975

[51] Int. Cl.² ............................................. H02K 7/02
[52] U.S. Cl. ................................................... 310/74
[58] Field of Search .............. 318/138, 254, 161, 439; 310/74, 46, 366

[56] References Cited

U.S. PATENT DOCUMENTS

| | | | |
|---|---|---|---|
| 1,231,193 | 6/1917 | Powers | 310/14 X |
| 3,532,947 | 10/1970 | Grup | 318/138 |
| 3,551,765 | 12/1970 | Miyasaka | 318/138 |
| 3,560,817 | 2/1971 | Amato | 318/138 |
| 3,610,974 | 10/1971 | Kenyon | 310/266 X |
| 3,652,883 | 3/1972 | Cone | 310/74 |
| 3,890,548 | 6/1975 | Gray | 318/439 |

Primary Examiner—Robert K. Schaefer
Assistant Examiner—John J. Feldhaus
Attorney, Agent, or Firm—Basile & Weintraub

[57] ABSTRACT

An electromagnetic system for more efficiently utilizing energy wherein an outside power source is utilized to rotate a flywheel to a predetermined velocity. A plurality of armatures mounted on the periphery of the flywheel pass through a plurality of magnetic fields generated by stationary coils mounted at radially spaced locations around the rotating flywheel. The magnetic fields are generated by an electric current from a circuit that is so arranged that the magnetic fields are generated and collapsed in time relationship to the rotary movement of the armatures such that, as the armatures approach the magnetic field, they are drawn toward the center of the magnetic field at which point the magnetic field collapses and is regenerated with a reverse polarity so as to repel the armature from the center of the magnetic field whereby the flywheel rotation is maintained at the desired velocity.

1 Claim, 8 Drawing Figures

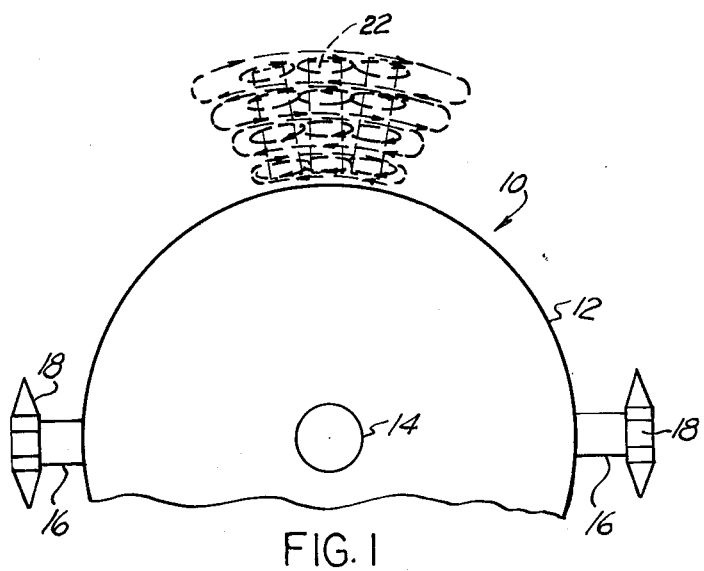
FIG. 1
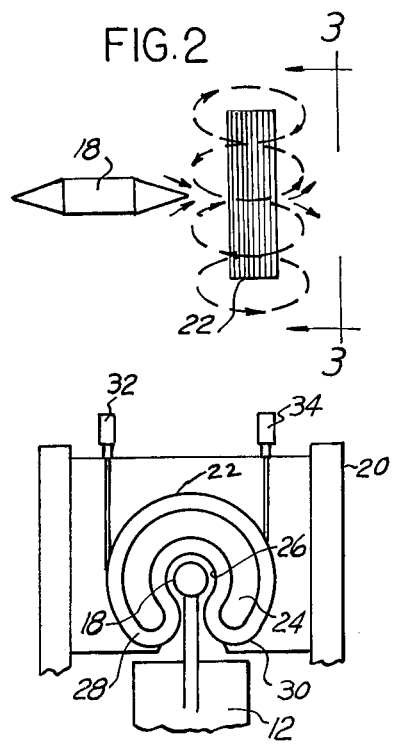
FIG. 2
FIG. 3
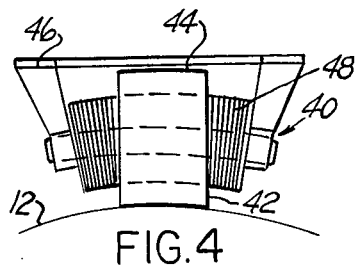
FIG. 4
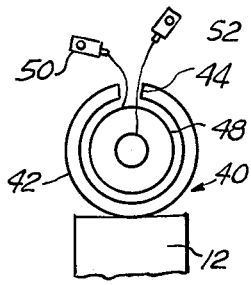
FIG. 5
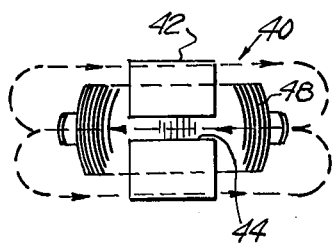
FIG. 6

4,086,505

ELECTROMAGNETIC SYSTEM

BACKGROUND OF THE INVENTION

I. Field of the Invention

The present invention relates to electrical systems and, in particular, the present invention relates to an electromagnetic means for maintaining a rotating flywheel at a predetermined velocity.

II. Description of the Prior Art

Direct current or DC machines are used either as an electric motor fed by DC power supply or as a generator which produces a direct current. The motor and the generator are essentially identical in construction; that is, a DC machine may be used for either purpose. Generally, the DC machine comprises a stator which may have two magnetic poles for producing a magnetic field and a rotor usually called the armature in a DC machine which rotates between the poles. The stator poles are provided with windings through which the current flows. The armature may also have windings consisting of conductors (coils of wire) disposed in grooves formed in the armature core with the latter being generally composed of sheet steel laminations. The end of the armature core coils are each connected to one of the insulated copper segments of a commutator. The current for driving a motor is applied through brushes and the commutator, and at the same time part of the current is used to energize the field windings. The commutator is generally mounted on the armature shaft and rotates with it. When current is passed through the armature windings of a motor, the magnetic fields of the armature and stator strive to place themselves parallel to each other. As a result, the armature develops a torque (turning moment) about its shaft. The magnitude of the torque is proportional to the strength of the magnetic field and of the current. There are generally three types of motors. The first is known as the shunt motor wherein the field winding is connected and parallel with the armature and is, thus, energized by a current of constant voltage so that the magnetic field is constant. In such shunt motors when a load is applied the speed decreases, but not considerably. This type of motor has a fairly constant speed at all loads and is especially suitable for driving machine tools and the like. In the second type of motor known as the series motor, the field and armature windings are connected in series so that the strength of the field is dependent on the motor load and varies with the armature current. Such motors generally develop a high torque at starting and run at a speed depending on load. The third form of motor is known as the compound motor which has, in addition to the shunt field windings, a series winding which reinforces the field and gives a fairly high starting torque while retaining the speed limiting properties of the shunt winding.

If the armature winding of a DC generator is connected to continuous slip rings instead of to a segmented commutator, an alternating current (AC) is collected from these rings by the brushes. In this type of machine the armature winding in which the output current is generated is on the stator (the stationary frame in the machine) while the field system revolves on the rotor. The voltage produced by the AC generator depends on the strength of the excitation current, speed of rotation in a number of pairs of poles on the magnetic wheel. The frequency of the voltage is also directly dependent on the speed and the number of pole pairs. the aforementioned description of the AC and DC motors and generators is representative of the basic prior art principles; however, as will be seen hereinafter applicant's novel invention utilizes the simplicity of a DC motor but provides an alternating current input in time relation to the movement of a rotating armature to obtain a smooth continuous output.

SUMMARY OF THE INVENTION

The present invention, which will be described subsequently in greater detail, comprises an electromagnetic system for more efficiently utilizing energy and wherein the system comprises a rotating flywheel having a plurality of armatures of a material of magnetic properties wherein the armatures pass by a plurality of stationary coils radially displaced from the rotating flywheel. An electric current is passed through the coils to generate a magnetic field which is generated and collapsed and regenerated in time relation to the rotation of the armatures such that, as the field is generated, the armature is attracted toward the center of the coil whereupon the field collapses and is regenerated in an opposite polarity to repel the armature and thereby impart to the rotating flywheel a sufficient force to maintain the flywheel rotation at a selected velocity.

It is therefore an object of the present invention to provide a new and improved electromagnetic system which is adapted to extend the life of a spinning flywheel wherein an external supply of energy is utilized to accelerate a flywheel-armature assembly to a desired velocity, and a plurality of coils are energized to maintain the flywheel rotation at a desired velocity.

Other objects, advantages, and applications of the present invention will become apparent to those skilled in the art of electromagnetic circuits and systems when the accompanying description of several examples of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a fragmentary front elevational view of an electromagnetic device constructed in accordance with the principles of the present invention;

FIG. 2 is a fragmentary top plan view of the electromagnetic device illustrated in FIG. 1;

FIG. 3 is a fragmentary side elevational view as seen from Line 3—3 of FIG. 2;

FIG. 4 is a front elevational view of a second example of an electromagnetic device constructed in accordance with the principles of the present invention;

FIG. 5 is a side elevational view of the electromagnetic device illustrated in FIG. 4;

FIG. 6 is a top plan view of the electromagnetic device illustrated in FIGS. 4 and 5;

DESCRIPTION OF THE PREFERRED EMBODIMENTS

Figure 7:
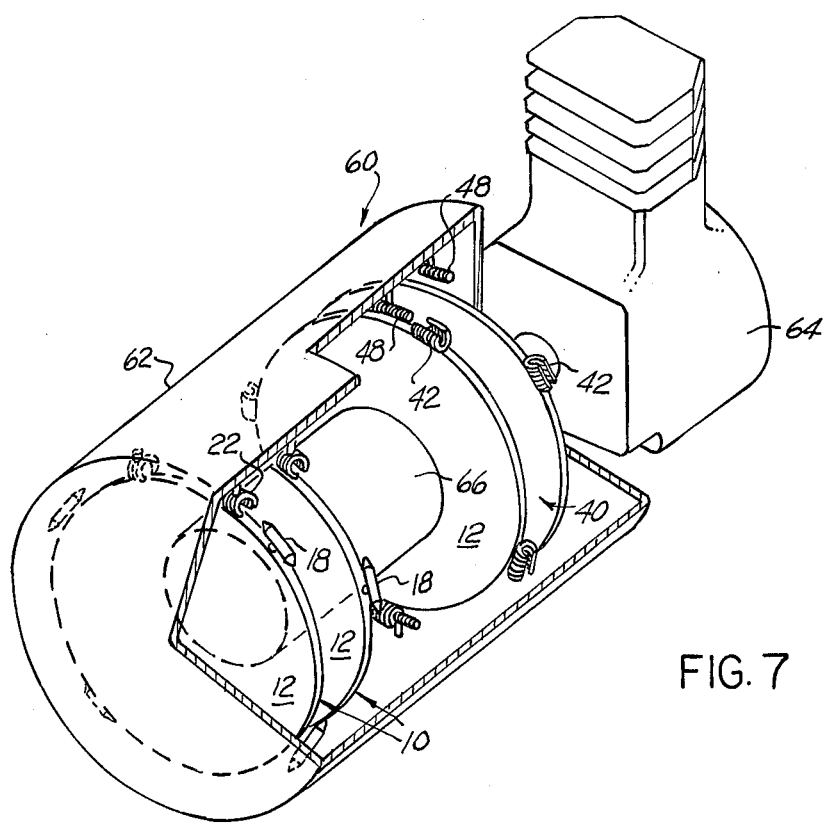
FIG. 7 is a perspective view of a mechanism which employs the electromagnetic devices illustrated in FIGS. 1–6 and wherein the electromagnetic devices rotate in a vertical plane.
Figure 8:
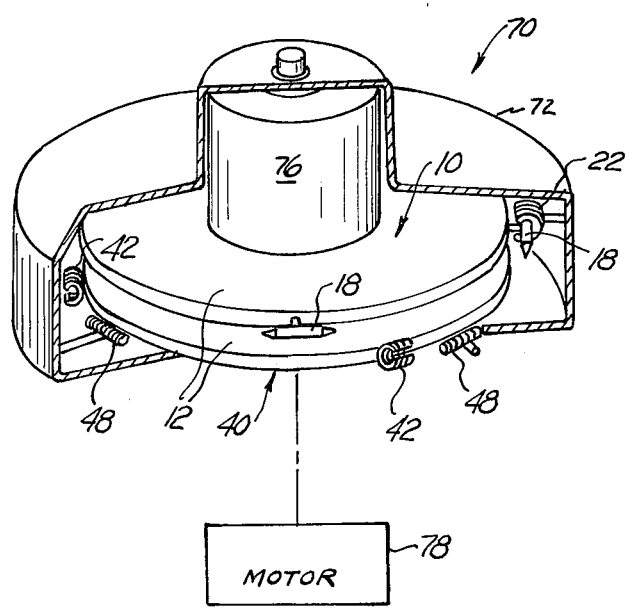
FIG. 8 is a perspective view of a second embodiment of the present invention in the form of a mechanism employing the electromagnetic devices illustrated in FIGS. 1–6 of the drawings and wherein the electromagnetic devices rotate in a horizontal plane.

Referring now to the drawings and, in particular, to FIGS. 1-3 of the drawings wherein there is illustrated one example of the present invention in the form of an electromagnetic device 10 comprising a flywheel 12 mounted for rotation about a suitable axis 14. The flywheel 12 should be made of a material that will permit the flywheel to be operated at a sufficiently high speed, yet one which will absorb fluctuations and speed and even out the torque output of the device. The flywheel 12 functions to receive the rotational impulse developed in a manner to be described hereinafter during operation of the electromagnetic device 10 and insures the continued smooth rotation of the device throughout its cycle.

The flywheel 12 has a plurality of radially extending support arms 16 having armatures 18 mounted at the extended ends thereof. As will be described hereinafter, the inventive electromagnetic device is mounted within a housing, the interior walls of which provide a means for mounting a plurality of support brackets 20 (FIG. 3) at strategic radially displaced locations around the periphery of the rotating flywheel 12 such that one or more coils 22 carried by each of the support brackets 20 are positioned to permit the armature 18 to pass therethrough, as shown in FIG. 3. Still referring to FIG. 3, it can be seen that the coil 22 is horseshoe shaped in that it has a central core 24 about which is disposed the wound wires that define the coil 22. The interior of the coil 22 defines an opening 26 through which the armature 18 passes, while the opposing ends of the legs 28 and 30 of the coil 22 provide a secondary opening through which the support arm 16 of the flywheel 12 passes to permit the smooth and continuous operation of the device. Suitable leads 32 and 34 extend from the coil 22 for connection to a source of electrical energy.

Referring now to FIGS 4, 5, and 6 wherein there is disclosed a second example of the present invention in the form of an electromagnetic device 40 which employs the flywheel 12 that is adapted for rotation about an axis 14 in the same manner as described with respect to the electromagnetic device 10. Instead of employing a plurality of support arms 16, the inventive device 40 utilizes a hollow armature 42 which is circular in cross section and has an elongated slot 44 that extends its full length at the top portion thereof; that is, at the portion of the armature 42 that is the greatest radial distance from the axis 14 of the flywheel 12. In a manner similar to the electromagnetic device 10, the device 40 is also disposed within a suitable housing that mounts a plurality of spaced support brackets 46 (FIG. 4) which are radially spaced from the axis 14 of the device 40 a sufficient distance such that an electromagnetic coil 48 carried by each bracket 46 is disposed in proper relationship to the armature 42. Thus, as the flywheel 12 rotates, the armature 42 will pass over the coil 48, as shown in FIGS. 4, 5, and 6 of the drawings.

The coils 22 and 48 may be made of various wire gages and numbers of turns to provide the required flux which will depend upon the size of the flywheel and the amount of energy desired to be imparted to the flywheel 12 to maintain its spinning motion. It should also be noted that the coils 22 and 48 may be disposed about the flywheel in any desired arrangement to provide the length of the desired magnetic field, again the same depending upon the amount of energy required to rotate the flywheel 12.

The bracket 46 of the electromagnetic device 40 includes suitable means for permitting the leads 50 and 52 of the coil 48 to extend from the coil safely past hollow armature 42 for connection to a source of electrical energy, as will be described hereinafter.

Referring now to FIG. 7 of the drawings, there is illustrated one example of the present invention in the form of an electrical-magnetic system 60 for more efficiently utilizing energy and comprising a housing 62 within which is mounted a generator 66 having shafts extending from the opposite ends thereof to support the flywheels 12 of the electromagnetic devices 10 and 40 for rotation in a vertical plane. Additionally, the shaft extends exteriorly of the housing 62 for connection to a suitable prime mover such as a small gasoline engine 64. It should be understood that the gasoline engine 64 is illustrated only as one example of a prime mover, and other forms may be had such as an electric motor. Initially, the prime mover, such as the gasoline engine 64, is utilized to accelerate the flywheels 12 to a desired number of revolutions per minute. The coils 22 and 48 of the electromagnetic devices 10 and 40 are then energized to maintain the armature rotation at the desired speed utilizing the advantageous position of leverage obtained by arranging the coils at the outer perimeter of the flywheel 12.

Referring now to FIG. 3 wherein there is illustrated a second example of the present invention in the form of an electrical-magnetic system 70 which comprises a housing 72 which supports a generator 76 having a shaft that extends downwardly to rotatably support the flywheels 12 of the electomagnetic devices 10 and 40, such that the flywheels 12 rotate in a horizontal plane. The housing 72 provides suitable means for supporting the coils 22 and 48 in the aforementioned manner. A suitable prime mover 78 is utilized to rotate the flywheels 12 of each of the electromagnetic devices to the desired speed.

Initially, the power source 64, such as the aforementioned gasoline engine or electric motor, is utilized to drive the flywheels 12 to a desired revolution per minute. After the flywheels have been rotated to the desired speed, their continued rotation will be utilized to drive the generator 66 whose output current will be utilized by an appropriate user. Continued rotation of the flywheels is insured by the aforementioned imparting of energy from the coils to the armatures as the armatures rotate thereby.

In circuits taking advantage of a reversing current, the armatures 18 and 42 which are respectively attracted to the magnetic fields of the coils 22 and 48 are permanent magnets. The spacing of the armatures and the rate of rotation must be in time relationship with the source of energy, that is, the armatures must by attracted as the armatures enter the magnetic fields created by the coils; and as the armatures approach the center of the magnetic fields within the coils, the field generated by the source of energy must collapse and then regenerate itself in an opposite polarity, all of which functions to repel the armatures from the magnetic field in a continuous action and thereby imparting a continuous rotating action on the flywheel to aid in maintaining the flywheel at its desired revolution per minute. A suitable circuit for accomplishing this relationship is such that one of ordinary skill in the art could construct, and thus a detailed description of the same is not necessary.

In less complex circuits the armatures will be made of a soft steel with good permeability and low retentivity. Thus, as the armatures approach the magnetic field, the armatures would be attracted and drawn into the center of the magnetic field. At the peak of attraction the magnetic field collapses and the armature passes therethrough to maintain a continuous rotation. The spacing of the armatures on the flywheel, the rate of rotation, and the length of the magnetic field has to be determined in time relationship to the continuous rotation of the wheel so as to provide a smooth and continuous action.

It can thus be seen that the present invention has provided a new and improved electromagnetic system employing a more efficient utilization of energy.

It should be understood by those skilled in the field of electromagnetic devices that other forms of the invention may be had without departing from the spirit of the invention or the scope of the appended claims.

What is claimed is as follows:

1. An electromagnetic motor comprising:
a first flywheel mounted on a shaft for rotation about an axis;
a plurality of armatures spaced at 90° intervals, each armature being of a material having magnetic properties, said armatures being attached to the periphery of said flywheel and rotatable therewith, each of said armatures having a cylindrically shaped mid-section and conically shaped end sections, the apexes of which point in opposite directions;
a plurality of stationary coils radially spaced from said rotating flywheel and through which an electric current is passed for generating a magnetic field to attract said armatures toward said coils to rotate said flywheel, said coils being of a horseshoe shape having an interior section opening to said flywheel, said armatures being complementarily shaped to said coil interiors such that said armatures may pass through the center of said coil interiors;
a plurality of support arms, each arm having one end attached to said flywheel periphery and extending radially outward therefrom with an opposite end attached to one of said armatures, said arms being sized to maintain said armatures in a radially spaced relationship with said flywheel such that said armatures may pass through said coils without said flywheel engaging said coils;
a second flywheel axially spaced from said first flywheel and mounted for rotation on said shaft on an axis common to the axis of rotation of said first flywheel and rotatable with said first flywheel;
a plurality of second armatures, each second armature being of a material having magnetic properties, said armatures being of a semi-circular shape and attached to the periphery of said flywheel and rotatable therewith, to open portion of said semi-circular shaped armatures facing radially outward;
a plurality of second stationary coils radially spaced from said rotating flywheel and through which an electric current is passed for generating a magnetic field to attract said second armatures toward said second coils to rotate said second flywheel, said second coils being of a cylindrical shape having an exterior surface shape complementary to the interior shape of said semi-circularly shaped second coils such that said second coils may pass through the center of said semi-circularly shaped armatures; and
an electric motor coupled to said shaft for rotating said flywheels to a predetermined velocity, the action of the magnetic fields generated by said coils on said armatures maintaining said flywheels at said predetermined velocity.

* * * * *